US006462312B1

United States Patent
Feagley

(10) Patent No.: US 6,462,312 B1
(45) Date of Patent: Oct. 8, 2002

(54) MAGNETICALLY ATTACHED HEATING UNIT FOR A CHAFING DISH

(76) Inventor: Robert W. Feagley, 321 SE. 13th Ct., Pompano Beach, FL (US) 33060

( * ) Notice: Subject to any disclaimer, the term of this patent is extended or adjusted under 35 U.S.C. 154(b) by 0 days.

(21) Appl. No.: 10/028,904

(22) Filed: Dec. 20, 2001

(51) Int. Cl.[7] .......................... A47J 36/24; H05B 3/06; H05B 3/78; F24H 9/06
(52) U.S. Cl. ...................... 219/436; 219/433; 219/536
(58) Field of Search ................................. 219/436, 430, 219/432, 433, 536, 537

(56) References Cited

U.S. PATENT DOCUMENTS

| 2,507,559 A | | 5/1950 | D'Andrea |
| 3,423,708 A | | 1/1969 | Christian |
| 3,835,290 A | * | 9/1974 | Peters ......................... 219/536 |
| 3,978,844 A | | 9/1976 | Wilkens |
| 4,045,654 A | | 8/1977 | Eide |
| 4,164,644 A | | 8/1979 | Remsnyder et al. |
| 4,484,682 A | | 11/1984 | Crow |
| 4,492,355 A | | 1/1985 | Bylin |
| 4,506,138 A | | 3/1985 | Benett et al. |
| 4,638,786 A | | 1/1987 | Lucky |
| 4,658,117 A | | 4/1987 | Sayward, Jr. |
| RE32,643 E | * | 4/1988 | Bennett et al. ............. 219/536 |
| 4,751,368 A | | 6/1988 | Daifotes |
| 4,867,410 A | | 9/1989 | Jurgich |
| 4,899,722 A | | 2/1990 | Horewitch |
| D318,976 S | | 8/1991 | Thurlow et al. |
| 5,045,672 A | | 9/1991 | Scott |
| 5,381,729 A | | 1/1995 | Hennesey et al. |
| 5,405,004 A | | 4/1995 | Vest et al. |
| 5,699,910 A | | 12/1997 | Kubat |
| 5,811,766 A | * | 9/1998 | Fabrikant et al. ........... 219/432 |
| 5,977,521 A | | 11/1999 | Mehta et al. |
| 5,990,455 A | | 11/1999 | Scott et al. |
| 6,157,007 A | | 12/2000 | Scott, III |

* cited by examiner

Primary Examiner—Joseph Pelham
(74) Attorney, Agent, or Firm—Ronald V. Davidge

(57) ABSTRACT

A heating unit, which is powered by electricity or gas, is removably attached to the lower surface of a water tray in a chafing dish. The heating unit is held in place by magnetic attraction between the heating unit and an attachment frame placed within the water tray. Either or both the heating unit and the attachment frame include permanent magnets establishing a magnetic field extending through the nonmagnetic material of the water tray.

20 Claims, 3 Drawing Sheets

MAGNETICALLY ATTACHED HEATING UNIT FOR A CHAFING DISH

BACKGROUND OF THE INVENTION

1. Field of the Invention

This invention relates to heating units for use with a chafing dish and, more particularly, to an electric or gas-powered heating unit which is removably attached to extend below a water pan within the chafing dish.

2. Background of the Invention

A conventional chafing dish includes a frame holding a water tray and a food tray, with a system of complimentary flanges in the trays supporting the food tray to extend above the water tray. The water tray is heated by means of a heating unit burning a solid hydrocarbon fuel sold, for example, under the trade name STERNO, generally with the heater being supported on a structure forming a part of the frame. An example of this type chafing dish of is shown in U.S. Pat. No. Des. 318,976. While this kind of apparatus is widely used to keep food warm as it is presented at a buffet or party, several problems are associated with its use. First, the solid fuel, which is expensive, cannot easily be used to exhaustion, so partly used containers are typically discarded after use. In addition, chafing dishes are often used for outdoor events in which it is difficult to keep the heating units lit during windy conditions. Even when the heating units remain lit during windy conditions, the flame may be held away from the pan by the wind, so that heating is ineffective. At some events, such heaters cannot be used due to restrictions on the use of open flames. Additionally, it is often not apparent when the fire in a heating unit goes out, whether due to the wind or to the exhaustion of the fuel, so that the food is allowed to cool before the problem is discovered. Furthermore, it is often not apparent when the water within the water tray boils away, so that food is burned and the chafing dish is damaged by overheating before the problem is discovered. Finally, objections are often raised to the odor caused by burning the solid fuel.

Various of these problems may be solved by using a chafing dish heated by an electric heating element. Several examples from the patent literature describe food warmers including submerged electric heating elements extending within a water tray. For example, U.S. Pat. No. 4,658,117 describes a chafing dish having a stationary hollow housing extending within the water tray to define a cylindrical passage having an entrance through the outside of the tray. A removable member containing an electric resistance heater is inserted within the passage, with an electric cord extend outward. U.S. Pat. No. 5,381,729 describes a food warming vessel including a sump vessel partly filled with water, serving as the water tray in a chafing dish, with a U-shaped electric heating element held in place to extend within the water. The ends of the heating element are thermally connected through a metal bar to a thermostat used to control the heating element. U.S. Pat. No. 5,045,672 describes a chafing dish having a constantly energized, lift-out immersion heater including a first loop, positioned in the water pan and configured to permit concurrent use of flame beneath the water pan from cans of fuel without the flame damaging the heater. The heater also includes cool arms which extend upward through notches in the food pan or in the water pan. The water in the pan serves to moderate the temperature achieved during operation. U.S. Pat. No. 5,990,455 describes a chafing dish including a heating element forming a loop extending within the water of the water tray and extending upward to be supported by a rectangular frame extending along the upper flange of water tray. While each of these patents describes a chafing dish including an electric heating element, what is needed is a removable electric heating unit for use with existing, conventional chafing dishes in place of the canned fuel burners.

U.S. Pat. No. 6,157,007 describes an immersion heater, including a heating element forming a loop to extend within the water of the water tray of a chafing dish and additionally extending upward to be supported by a foldable L-shaped frame extending along two sides of the water tray. While such a heater can be used with a number of different chafing dishes, substantial limitations are placed on the geometry of the chafing dish. For example, the water tray must be large enough to include the loop of the heating element. If the water tray is too shallow, the loop of the heating element cannot fit within the tray. On the other hand, if the food tray extends too far down into the water tray, the food tray cannot be placed within the water tray with the heating element in place. What is needed is an attachable heating unit requiring only a water tray within the chafing dish having a sufficient flat area for the attachment of the heating element.

Additionally, removable immersion heaters having loop-type heating elements tend to be difficult to transport and store without damaging the exposed and unsupported heating elements. What is needed is a heating unit in which an electric element is mounted within a recessed plate to reduce its fragility.

U.S. Pat. No. 5,977,521 describes a chafing dish heated with an electric heater removably supported by a shelf disposed below the chafing dish. The base includes a base having a cylindrical bottom portion held within an aperture in the shelf sized for receiving a standard can heater. The heater further includes a resilient member extending upward from the base, and an electric heating assembly coupled to the resilient member opposite the base. The heating assembly has a heating surface positionable above the base by the compression of the resilient member. The heating surface is biased against the chafing dish when the base is supported by the shelf to provide a thermal interface to transfer heat between the heating surface and the chafing dish. What is needed is a simple method for holding an electrically heated heating surface against the lower surface of the water tray in a chafing dish without relying on a specific geometry of the chafing dish to include an appropriately spaced lower shelf with a circular aperture.

Chafing dishes are generally available in full-sized units requiring two standard can heaters or two of the electric heaters described in U.S. Pat. No. 5,977,521. Smaller chafing dishes requiring only one can heater or one of these electric heaters are also available. What is needed is a removable electric heater that cab be used as a single unit with either the larger type of chafing dish or with the smaller type of chafing dish.

U.S. Pat. No. 4,899,722 describes a burner assembly for use with a chafing dish supported above a support surface by a leg structure. The burner assembly includes a butane fuel source or reservoir, a burner head connected to the fuel source, a valve mounted between the fuel source and the burner head to control the flow of butane to the burner head, and a burner head support structure supporting the burner head above the support surface. The burner support structure further includes a base having a portion formed for positioning proximate and outwardly of the leg structure of the chafing dish, and an arm portion, holding the burner head, extending as a cantilever from the base portion to allow the placement of the burner head over a conventional shelf provided in the chafing dish to hold a canned fuel heater. Four vertically adjustable legs extend downward from the base portion, being adjusted to space the burner head at an appropriate distance below the lower surface of the water pan of the chafing dish. What is needed is a gas-powered burner assembly including a means holding the burner at the appropriate distance below the lower surface of the lower surface of the water pan without a need for leg adjustments and without the placement of a base portion outside the leg structure of the chafing dish.

The patent literature also includes a number of descriptions of devices including permanent magnets used to removably fasten the devices to structures composed of magnetic materials. For example, U.S. Pat. No. 4,506,138 describes the use of a preheater unit magnetically attachable the surface of an oil pan of an automobile engine, with magnetic flux extending from a permanent magnet within the unit through a pair of magnetic pole pieces and a non magnetic heat transfer plate to the magnetic attachment structure of the oil pan. For example, U.S. Pat. Nos. 5,405,004 and 5,699,910 describe tool trays having magnets for attachment to magnetic surfaces. U.S. Pat. No. 4,484,682 describes a container for food and miscellany having a permanent magnet in its bottom for holding the container in place on a magnetically attractable surface. U.S. Pat. No. 4,638,786 describes a utensil holder having magnets used for attachment of a magnetic cooking surface. U.S. Pat. No. 3,423,708 describes a crescent shaped magnetic sheet, with a pair of the plates, placed on opposite sides of a pan, being used to hold the pan in place on the magnetic surface of a stove. U.S. Pat. No. 4,867,410 describes a combination stand/holder having a channel-shaped column with a magnet and slots for receiving handles of utensils, which are held in place over a magnetic stove top surface. U.S. Pat. No. 4,492,355 describes a mounting device for a heater module which permits rapid installation and removal of the device from a ferromagnetic surface.

U.S. Pat. No. 2,507,559 describes a pair of cleaning elements provided with permanent magnets and adapted to be placed on opposite sides of a window pane or similar surface to be cleaned. When one cleaning element is rubbed against the inside surface of the pane, the magnetic field causes the other element to move correspondingly, so that both surfaces of the window pane may be cleaned simultaneously.

What is needed is a means for removably attaching a heating device to the nonmagnetic surface of a conventional chafing dish water tray.

SUMMARY OF THE INVENTION

According to a first aspect of the invention, a heating unit and an attachment frame are provided for heating a chafing dish. The heating unit includes a first magnetic attachment structure having a first face extending upward, a first frame attached to the first magnetic attachment structure to extend downward from the first face, and a heating element for generating heat within the first frame. The attachment frame includes a second magnetic attachment structure having a second face extending downward, wherein the first face of the first magnetic attachment structure is magnetically attracted to the second face of the second magnetic attachment structure.

Preferably, the first magnetic attachment structure includes a number of first magnetic attachment devices attached to the first frame in a first pattern, and the second magnetic attachment structure includes a plurality of second magnetic attachment devices attached to the second frame, in a pattern aligning the second magnetic attachment devices with the first magnetic attachment devices in the first pattern. Each of these first magnetic attachment devices includes a first device face extending along the first face, and each of these second magnetic attachment devices includes a second device face extending along the second face. The first device face of each of the first magnetic attachment devices is magnetically attracted to a second device face of an adjacent second magnetic attachment device among the second magnetic attachment devices.

The heating element may include an electric resistance-heating element, with the heating unit additionally including a line cord for supplying electrical current to the heating element. Alternately, the heating element may include a gas burner, with the heating unit additionally including a gas line for supplying combustible gas to the gas burner.

In accordance with another aspect of the invention apparatus for heating food is provided. The apparatus includes a food tray for holding the food, a water tray for holding water extending below the food tray, a heating unit, and an attachment frame. The water tray includes a flat lower portion composed of a nonmagnetic material. The heating unit includes a first magnetic attachment structure having a first face extending upward, a first frame attached to the first magnetic attachment structure to extend downward from the first face, and a heating element for generating heat within the first frame. The attachment frame, which is disposed on top of the flat lower portion of the water tray includes a second magnetic attachment structure having a second face extending downward, and wherein the heating unit is held in place under the flat lower portion of the water tray by magnetic attraction between the first and second magnetic attachment structures.

DETAILED DESCRIPTION OF THE INVENTION

Figure 1:
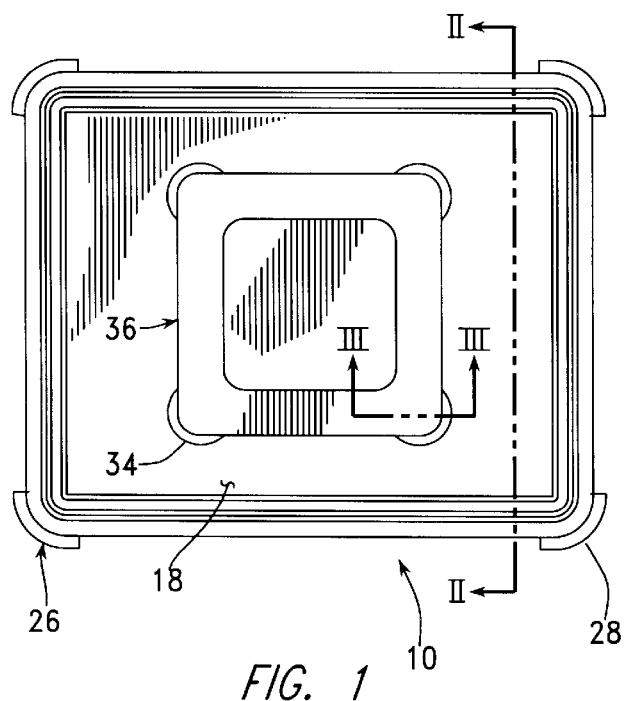
FIG. 1 is a plan view of a chafing dish and a heating unit built in accordance with a first embodiment of the present invention, shown with a food tray removed from the chafing dish.
Figure 2:
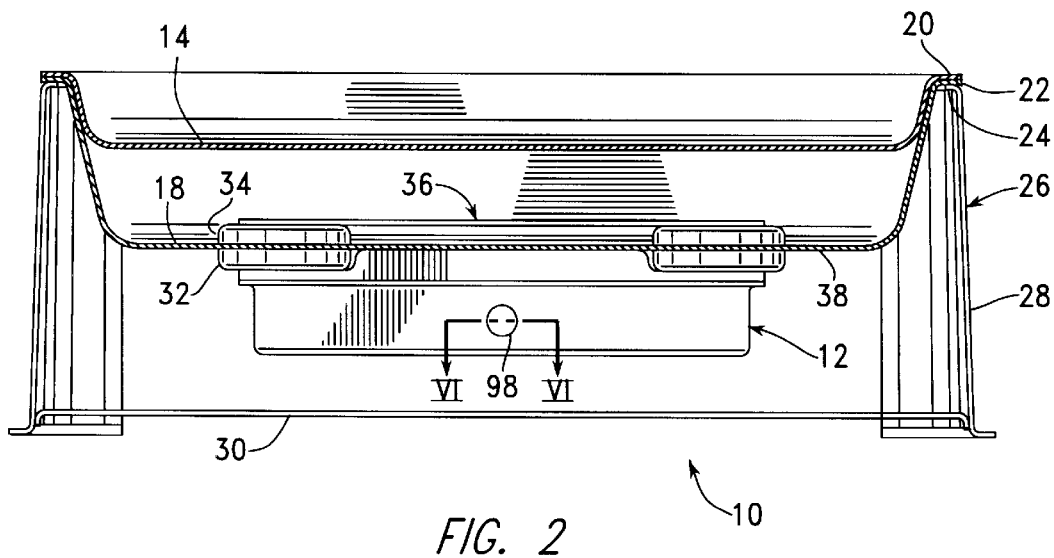
FIG. 2 is a cross-sectional elevation of the chafing dish and heating unit of FIG. 1, taken as indicated by section lines II—II therein to provide a front elevation of the heating unit therein.

A first embodiment of the invention will now be described, with initial reference being made to FIGS. 1 and 2, which show a chafing dish 10 having attached thereto a heating unit 12 built in accordance with a first version of the invention. FIG. 1 is a plan view of the chafing dish 10 with a food tray removed therefrom, and FIG. 2 is a cross-sectional elevation of the chafing dish 10, taken as indicated by section-line II—II in FIG. 1 to provide an elevation of the heating unit 12.

The chafing dish 10 is, for example, of a conventional type, including a food tray 14 extending above a water tray 18, with the food tray 14 being held in place by flanges 20 shaped to fit above and along the flanges 22 of the water tray 18. The flanges 22 of the water tray 18 are in turn supported by flanges 24 of a stand 26 holding the water tray 18 in place above a supporting surface, such as a table (not shown). The stand 26 includes four legs 28 extending between this supporting surface and the flanges 24. The stand 26 may also include a shelf 30 extending among the four legs 28.

The heating unit 12 includes four magnetic attachment structures 32, which are attracted by magnetic forces to four corresponding magnetic attachment structures 34 extending downward from an attachment frame 36. The frame 36 and the heating unit 12 are disposed on opposite sides of the water tray 18, so that the attractive forces exerted between the adjacent magnetic attachment structures 32 and 34 are sufficient to hold the heating unit 12 upward, against the lower surface 38 of the water tray 18. Frictional forces associated with these attractive forces are sufficient to restrain the heating unit 12 and the attachment structure 38 from sliding along the water tray 18. The water tray 18 is conventionally composed of a nonmagnetic material, such as an austenitic stainless steel, which is not significantly attracted to either of the magnetic attachment structures 32, 34, but which serves as a gap through which magnetic flux extends to provide for the magnetic attraction between adjacent magnetic attachment structures 32 and 34.

Figure 3:
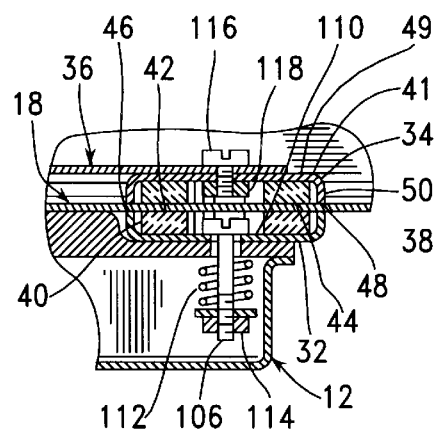
FIG. 3 is a fragmentary cross-sectional elevation of the chafing dish and heating unit of FIG. 1, taken as indicated by section lines III—III therein to show magnetic attachment structures holding the heating unit in place within the chafing dish.

FIG. 3 is a fragmentary cross-sectional elevation of the chafing dish 10 and heating unit 12 of FIG. 1, taken as indicated by section line III—III therein to show the construction of the magnetic attachment structures 32, 34. Each of these structures 32, 34 includes an annular permanent magnet 40 attached within a cup-shaped armature 41 composed of a magnetic material. The annular permanent magnet 40 is composed, for example, of a ceramic material. In each of the magnetic attachment structures 32 forming a part of the heating unit 12, the annular permanent magnet 40 is magnetized to have a first polarity (north or south) at its outer face 42. In each of the magnetic attachment structures 34 forming a part of the attachment structure 36, the annular permanent magnet 40 is magnetized to have a polarity opposite this first polarity at its outer face 44. In each of the magnetic attachment structures 32, 34, magnetic flux extends within the permanent magnet 40 and within the cup-shaped armatures 41. Magnetic flux also extends between the magnetic attachment structures 32, 34, across a gap provided by the nonmagnetic material of the water tray 18, with a strong attraction being formed between the faces 42 and 44 of the two permanent magnets 40 on opposite sides of the water tray 18, and also between the faces 46, 48 of the cup-shaped armatures 41.

While the magnetic attachment structures have been shown as being round, it is understood that similar results may be obtained using devices having a different shape, such as square devices, each with an armature 40 generally including a flat plate portion 49 and a ridge portion 50 extending around the permanent magnet 40.

Figure 4:
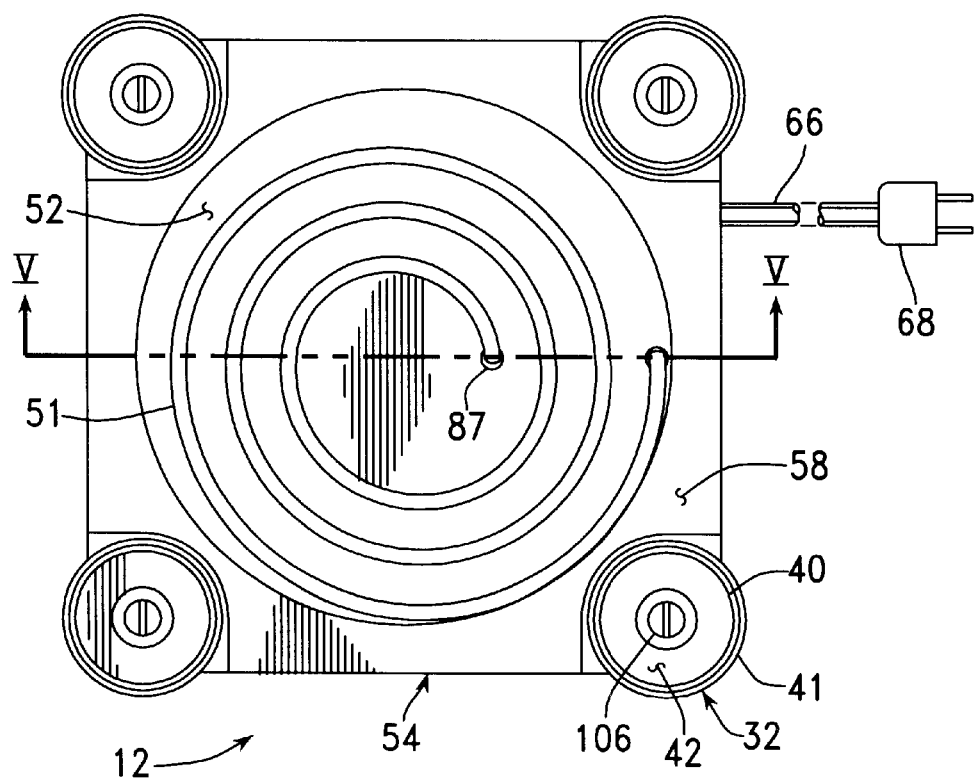
FIG. 4 is a plan view of the heating unit of FIG. 1.
Figure 5:
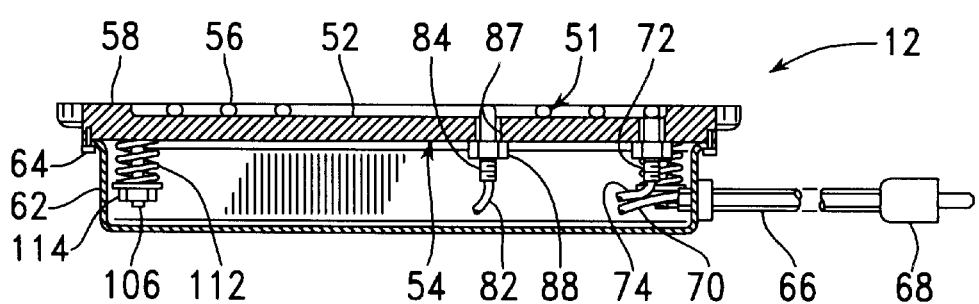
FIG. 5 is a cross-sectional elevation of the heating unit of FIG. 1, taken as indicated by section line V—V in FIG. 4 to show the configuration of heat generation and transfer structures.
Figure 6:
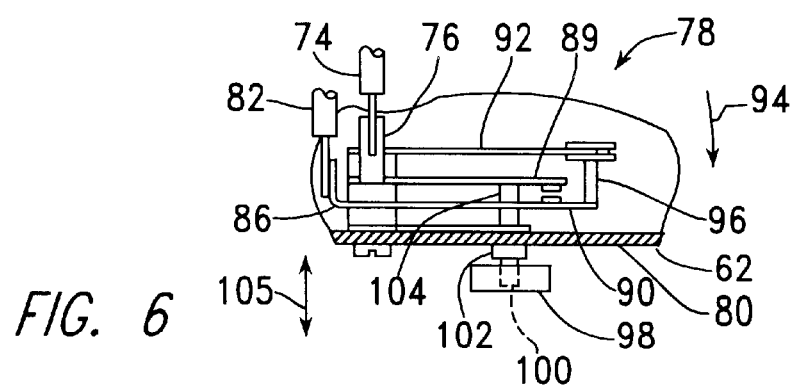
FIG. 6 is a fragmentary cross-sectional plan view of the heating unit of FIG. 1, taken as indicated by section lines VI—VI in FIG. 2, to show a thermostatic control within the heating unit.

Various elements of the heating unit 12 associated with its performance to provide heat will now be discussed, with particular reference being made to FIGS. 4–6. FIG. 4 is a plan view of the heating unit 12; FIG. 5 is a cross-sectional elevation thereof, taken as indicated by section lines V—V in FIG. 4, and FIG. 6 is a is a fragmentary plan view showing a thermostatic control within the heating unit 12, taken as indicated by section lines VI—VI in FIG. 2.

Within the heating unit 12, heat is generated by driving an electrical current through a spiral-shaped resistance-heating element 51, which extends within a recessed trough 52 in an upper plate 54, which is preferably composed of a material, such as aluminum, having a high thermal conductivity. The heating element 51 rests within the trough 52, with an upper surface 56 of the heating element 51 being essentially coplanar with the upper surface 58 of the upper plate 54. When the heating unit 12 is installed on the chafing dish 10, the magnetic attachment apparatus described above in reference to FIG. 3 holds both the upper surface 58 and the upper plate 54 in contact with, or in close proximity to, the lower surface 38 of the water tray 18, so that heat is transferred to this lower surface 38 directly from the upper surface 56 of the heating element 51 and indirectly from a lower surface 60 of the heating element 51 through the upper plate 54. A box-shaped frame structure 62 extends downward from the upper plate 54, being attached thereto by a number of screws 64.

Electrical current to power the heating element 51 is drawn through a line cord 66 extending to a conventional plug 68 for attachment to a source of electrical energy. A first wire 70 from the line cord 66 is connected to a wire extending from a first end 72 of the heating element 51, while a second wire 74 from the line cord 66 is connected to a first terminal 76 of a thermostatic control 78, attached to extend inward from a front wall 80 of the box-shaped frame structure 62. A wire 82, extending from a second end 84 of the heating element 51, is connected to a second terminal 86 of the thermostatic control 78. Preferably, each of the ends 72, 84 of the heating element 51, extending through a hole 87 within the upper plate 54, is threaded to accept a nut 88 used to hold the heating element 51 in place.

Within the thermostatic control 78, the first terminal 76 is electrically connected to a first flexible contact 89, and the second terminal 86 is electrically connected to a second flexible contact 90, so that when these flexible contacts 89, 90 are held together electricity flows through the heating element 51. When these contacts 89, 90 are separated, the circuit is broken, so that electrical current does not flow through the heating element 51. The thermostatic control 78 additionally includes a bimetallic strip 92, which is deflected in the direction of arrow 94 with increasing levels of temperature. When the temperature of the bimetallic strip 92 reaches a sufficiently high level, the movement of an insulating standoff 96 extending between the bimetallic strip 92 and the second flexible contact 90 causes the separation of the flexible contacts 89, 90.

The temperature at which this separation of the flexible contacts 89, 90 occurs is manually adjusted by turning a knob 98, attached to a threaded shaft 100, engaging threads within a nut 102 to drive an insulating interposer 104, also attached to the threaded shaft 100, inward and outward, in the directions of arrow 105. This interposer 104 extends through a hole (not shown) within the second flexible contact 90 to engage the first flexible contact 89, and to vary the position of the first flexible contact 89, and thereby the temperature at which separation of the contacts 89, 90 occurs.

The temperature of the bimetallic strip depends on the temperature of air within the box-shaped frame structure 62 and on the temperature of the front wall 80 of this structure 62. The thermostatic control 78 is used to control the operation of the chafing dish 10 by controlling the temperature of water within the water tray 18 and further to provide an automatic shut-off function in the event that all of the water evaporates from the water tray 18.

Referring again to FIG. 3, each of the magnetic attachment structures 32 within the heating unit 12 is preferably flexibly mounted to the upper plate 54 to provide for contact between the magnetic attachment structures 32 and the lower surface 38 of the water tray 18 in the event that this lower surface 38 has been warped by exposure to heat after evaporation of the water within the tray 18. For example, each magnetic attachment structure 32 is mounted by means of a screw 106 extending through a hole 108 in the upper plate 54. The magnetic attachment structure 32 is held downward, against a recessed surface 110 of the plate 54 by a compression spring 112 acting against a nut 114 attached to the screw 106.

Preferably, the compression springs 112 are formed to provide forces which are sufficient to support the weight of the heating unit 12, holding the four magnetic attachment structures 32 against the corresponding recessed surfaces 110 of the upper plate 54, when these structures 32 engage a flat water tray 18. On the other hand, preferably, the force exerted by each of the compression springs 112 is not sufficient to overcome the magnetic attraction between the magnetic attachment structure 32 and the adjacent magnetic attachment structure 34 of the attachment frame 36, so that the magnetic attachment structure 32 is allowed to pull away from the recessed surface 110 if the water tray 18 extending above the magnetic attachment structure 32 is warped upward, away from the magnetic attachment structure 32.

While the four magnetic attachment structures 34 of the attachment frame 36 are rigidly attached by means of screws 116 and nuts 118, the attachment frame 36 is preferably flexible enough to allow upward and downward deflection of these magnetic attachment structures 34, in order to accommodate a warped condition of the water tray 18.

A second embodiment of the invention will now be discussed with particular reference being made to FIG. 7, which is a plan view of a heating unit 120 built in accordance with this second embodiment, and to FIG. 8, which is a front elevation of this heating unit 120.

In the heating unit 120, heat is generated using a burner 122 attached to an external gas line 124 through a first tube 126, a valve 128, and a second tube 130. The external gas line 124 may be connected to a portable source of flammable gas, such as a butane or propane tank, or to a natural gas line. The valve 128, which is manually operated by turning a knob 131, may include a regulator, or the valve may be merely used to shut off the supply of gas if a regulator is provided at a tank supplying the external line 124. Alternatively, if a single gas tank having a regulator is used to supply several of the heating units 20, the valves 128 of the units may be used to control the relative flow of gas to the individual units 20.

The burner 122 is of a generally toroidal shape, forming a number of gas jets from openings 132 arranged in a circular pattern. The heating unit 120 also includes a box-shaped frame structure 134 having a bottom wall 136 including a number of apertures 138 through which air is drawn to support combustion, and sidewalls 140 having recessed edges 142 through which heated air and combustion products are expelled during operation. The burner 122 is supported from the surface of the bottom wall 136 by means of a number of standoffs 144.

Figure 7:
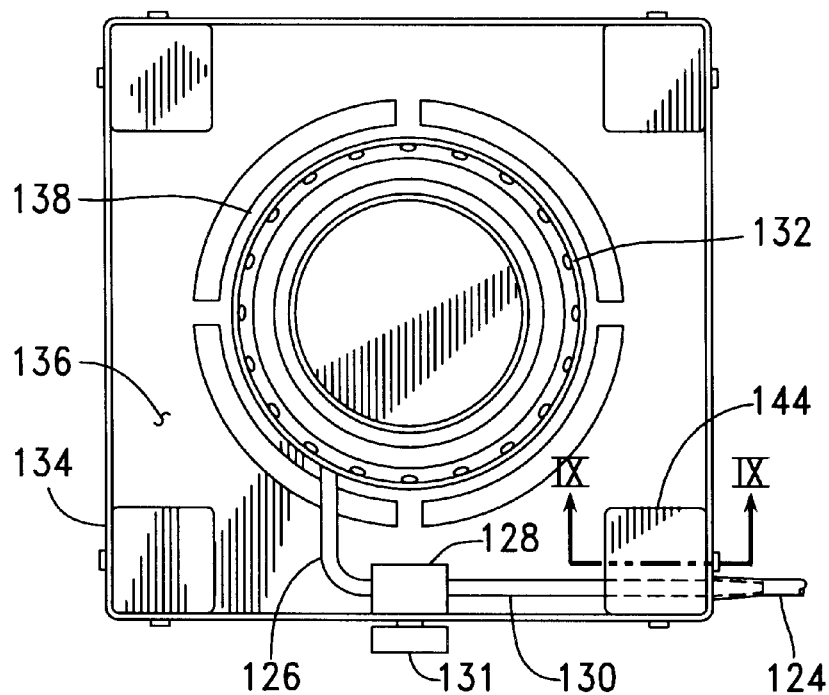
FIG. 7 is a plan view of a heating unit built in accordance with a second embodiment of the present invention.
Figure 8:
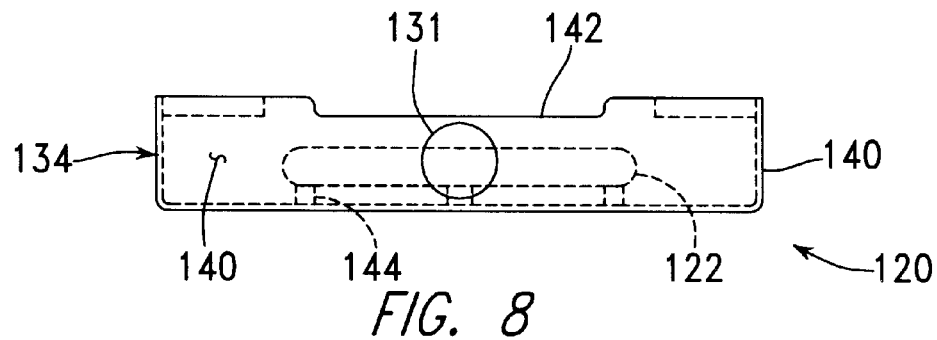
FIG. 8 is a front elevation of the heating unit of FIG. 7.
Figure 9:
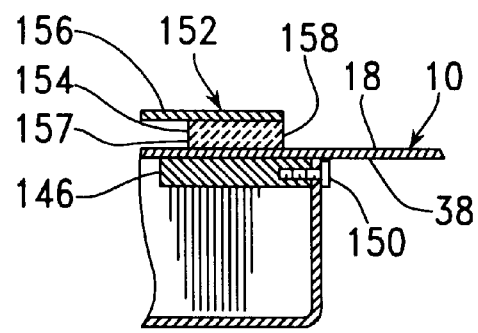
FIG. 9 is a fragmentary cross-sectional elevation of the heating unit of FIG. 7, taken as indicated by section lines IX—IX therein, as shown as attached to the chafing dish of FIG. 1.

FIG. 9 is a fragmentary cross-sectional elevation of the heating unit 120, taken as indicated by section lines IX—IX in FIG. 7, shown as installed on the chafing dish 10, which has been described above in reference to FIGS. 1 and 2.

The heating unit 120 includes four magnetic attachment structures 146, which are attached within the four corners of the upper edge 148 of the box-shaped frame structure 134 by means of screws 150. An attachment frame 152, provided with the heating unit 120, includes four magnetic attachment structures 154, which are attached to a. frame plate 156, being spaced apart so that the attachment frame 152 may be placed above the water tray 18 of the chafing dish 10 with the four attachment structures 154 of the attachment frame 152 directly above the four attachment structures 146 of the heating unit 120, with the heating unit 120 being held against the lower surface 38 of the water tray 18. Under these conditions, attractive forces exerted between the adjacent magnetic attachment structures 146, 154 are sufficient to hold the heating unit 120 upward, against the lower surface 38 of the water tray 18, and frictional forces associated with these attractive forces are sufficient to restrain the heating unit 120 and the attachment frame 152 from sliding along the water tray 18.

In the example of FIG. 9, the magnetic attachment structures 148 attached to the heating unit 120 are composed of a magnetic material, such as iron or steel, and the magnetic attachment structures 154 attached to the attachment frame 152 are permanent magnets having opposite poles (north and south) at their opposite ends 157, 158, so that magnetic flux from these ends 157, 158 extend through the magnetic attachment structures 146.

Alternately, permanent magnets may be attached to the heating unit 120, with magnetic materials forming adjacent portions of an attachment frame to be positioned above the water pan 18. In any case, surfaces of all materials forming portions of the attachment frame are preferably plated or otherwise coated to prevent rust or corrosion if such materials are subject to rust or corrosion in water.

The chafing dish 10 is used with either heating unit 12, 120 by moving the attachment frame 36, 152 and the heating unit 12, 120 in place as shown in FIGS. 2 and 9 above and below the water tray 18. This may be done before or after the water tray 18 is filled with water. The heating unit 12, 120 and the attachment frame 36, 152 are preferably removed from the water tray 18 after being slid along the tray, relative to one another, to reduce the attractive magnetic forces between the hearing unit 12, 120 and the attachment frame 36, 152.

While the invention has been described in its preferred forms or embodiments with some degree of particularity, it is understood that this description has been given only as an example, and that numerous changes in the details of fabrication and use, including the combination and rearrangement of parts, may be made without departing from the spirit and scope of the invention. For example, the magnetic attachment means described in reference to FIG. 9, may be used in a heating unit having an electrical resistance-heating element.

What is claimed is:

1. Apparatus for heating a chafing dish, wherein said apparatus comprises:
   a heating unit including a first magnetic attachment structure having a first face extending upward, a first frame attached to said first magnetic attachment structure to extend downward from said first face, and a heating element for generating heat within said first frame; and
   an attachment frame including a second magnetic attachment structure having a second face extending downward, wherein said first face of said first magnetic attachment structure is magnetically attracted to said second face of said second magnetic attachment structure.

2. The apparatus of claim 1, wherein said second magnetic attachment structure includes:
   a first permanent magnet having an outer surface extending along said first face, with a first magnetic polarity, and an inner surface extending opposite said outer surface, with a magnetic polarity opposite said first magnetic polarity, and
   an armature having a flat plate portion extending across said inner surface of said first permanent magnet and a ridge extending from said flat plate around said first permanent magnet to said first face.

3. The apparatus of claim 2, wherein said first magnetic attachment structure includes:
   a second permanent magnet having an outer surface extending along said second face, with a polarity opposite said first magnetic polarity, and an inner surface extending opposite said outer surface, with said first magnetic polarity, and
   an armature having a flat plate portion extending across said inner surface of said first permanent magnet and a ridge extending from said flat plate around said first permanent magnet to said second face.

4. The apparatus of claim 1, wherein
   said first magnetic attachment structure includes a block of magnetic material extending downward from said first face, and
   said second magnetic attachment structure includes a permanent magnet extending upward from said second face, wherein opposite poles of said permanent magnet extend adjacent said second face.

5. The apparatus of claim 1, wherein
   said first magnetic attachment structure includes a plurality of first magnetic attachment devices attached to said first frame in a first pattern,
   said second magnetic attachment structure includes a second frame plurality of second magnetic attachment devices attached to said second frame, in a pattern aligning said second magnetic attachment devices with said first magnetic attachment devices in said first pattern,
   each of said first magnetic attachment devices includes a first device face extending along said first face,
   each of said second magnetic attachment devices includes a second device face extending along said second face, and
   said first device face of each of said first magnetic attachment devices is magnetically attracted to a second device face of an adjacent second magnetic attachment device among said second magnetic attachment devices.

6. The apparatus of claim 5, wherein each of said first attachment devices is resiliently mounted to said first frame.

7. The apparatus of claim 6, wherein
   said first magnet attachment structure additionally includes a plurality of biasing springs,
   each of said first attachment devices is held downward against said first frame by a biasing spring in said plurality of biasing springs and allowed to move upward against a force provided by said biasing spring.

8. The apparatus of claim 5, wherein said second frame is flexible.

9. The apparatus of claim 5, wherein each of said first attachment devices includes:
   a first permanent magnet having an outer surface extending along said first face, with a first magnetic polarity, and an inner surface extending opposite said outer surface, with a magnetic polarity opposite said first magnetic polarity, and
   an armature having a flat plate portion extending across said inner surface of said first permanent magnet and ridge extending from said flat plate around said first permanent magnet to said first face.

10. The apparatus of claim 9, wherein each of said second magnetic attachment devices includes:
    a second permanent magnet having an outer surface extending along said second face, with a polarity opposite said first magnetic polarity, and an inner surface extending opposite said outer surface, with said first magnetic polarity, and
    an armature having a flat plate portion extending across said inner surface of said first permanent magnet and a ridge extending from said flat plate around said first permanent magnet to said second face.

11. The apparatus of claim 5, wherein
    each of said first magnetic attachment devices includes a block of magnetic material extending downward from said first device face, and
    each of said second magnetic attachment structure includes a permanent magnet extending upward from said second device face,
    opposite poles of said permanent magnet extend adjacent said second device face.

12. The apparatus of claim 5, wherein
    each of said first magnetic attachment devices includes a permanent magnet extending upward from said second face,
    opposite poles of said permanent magnet extend adjacent said first device face, and
    each of said second magnetic attachment devices includes a block of magnetic material extending upward from said second device face.

13. The apparatus of claim 1, wherein
    said heating element includes an electric resistance heating element, and
    said heating unit additionally includes a line cord for supplying electrical current to said heating element.

14. The apparatus of claim 13, wherein
    said first frame additionally includes an upper plate having a recessed trough and an upper surface extending along said first face,
    said electric resistance heating element extends within said recessed trough of said upper plate and includes an upper surface extending along said first face.

15. The apparatus of claim 13, wherein said heating unit additionally includes a thermostatic control breaking a circuit connecting said electric resistance heating element with said line cord when a set temperature of said thermostatic control is exceeded.

16. The apparatus of claim 1, wherein said heating element includes a gas burner, and said heating unit additionally includes a gas line for supplying combustible gas to said gas burner.

17. Apparatus for heating food, wherein said apparatus comprises:

a food tray for holding said food;

a water tray for holding water, wherein said water tray extends below said food tray, and wherein said water tray includes a flat lower portion composed of a non-magnetic material;

a heating unit including a first magnetic attachment structure having a first face extending upward, a first frame attached to said first magnetic attachment structure to extend downward from said first face, and a heating element for generating heat within said first frame; and an attachment frame disposed on top of said flat lower portion of said water tray, wherein said attachment frame includes a second magnetic attachment structure having a second face extending downward, and wherein said heating unit is held in place under said flat lower portion of said water tray by magnetic attraction between said first and second magnetic attachment structures.

18. The apparatus of claim 17, wherein said first magnetic attachment structure includes a plurality of first magnetic attachment devices attached to said first frame in a first pattern, said second magnetic attachment structure includes a second frame plurality of second magnetic attachment devices attached to said second frame, in a pattern aligning said second magnetic attachment devices with said first magnetic attachment devices in said first pattern, each of said first magnetic attachment devices includes a first device face extending along said first face, each of said second magnetic attachment devices includes a second device face extending along said second face, and said first device face of each of said first magnetic attachment devices is magnetically attracted to a second device face of an adjacent second magnetic attachment device among said second magnetic attachment devices.

19. The apparatus of claim 17, wherein said heating element includes an electric resistance heating element, and said heating unit additionally includes a line cord for supplying electrical current to said heating element.

20. The apparatus of claim 17, wherein said heating element includes a gas burner, and said heating unit additionally includes a gas line for supplying combustible gas to said gas burner.

* * * * *